(12) United States Patent
Fakhoury et al.

(10) Patent No.: US 7,159,697 B1
(45) Date of Patent: Jan. 9, 2007

(54) WHEEL HUB PILOT PROTECTOR

(75) Inventors: Omar J. Fakhoury, Rockford, IL (US); Reginal A. Pete, Caledonia, IL (US); Jeffrey W. Clark, Rockford, IL (US)

(73) Assignee: Gunite Corporation, Rockford, IL (US)

( * ) Notice: Subject to any disclaimer, the term of this patent is extended or adjusted under 35 U.S.C. 154(b) by 0 days.

(21) Appl. No.: 10/438,148

(22) Filed: May 14, 2003

(51) Int. Cl.
*F16D 65/10* (2006.01)
*B60B 30/06* (2006.01)

(52) U.S. Cl. .............................. 188/218 R; 188/18 A; 301/35.627

(58) Field of Classification Search ............ 188/206 R, 188/18 A, 18 R, 218 R, 251 R; 301/6.1–6.8, 301/35.627, 105.1, 111.01–111.07, 35.621, 301/35.63, 35.62; 29/894.362; 384/544; D12/207
See application file for complete search history.

(56) References Cited

U.S. PATENT DOCUMENTS

| 1,860,665 | A | * | 5/1932 | Eksergian | 301/35.627 |
| 2,046,779 | A | * | 7/1936 | Hack | 301/35.58 |
| 2,080,895 | A | * | 5/1937 | Nelson | 29/414 |
| 2,202,080 | A | * | 5/1940 | Baker | 152/48 |
| 3,009,742 | A | * | 11/1961 | Rabe et al. | 301/35.627 |
| 4,699,433 | A | * | 10/1987 | Kopp | 301/6.6 |
| 5,692,811 | A | * | 12/1997 | Rogers | 301/105.1 |
| 5,890,567 | A | * | 4/1999 | Pete et al. | 188/218 R |
| 5,938,292 | A | * | 8/1999 | Aaron, Jr. et al. | 301/105.1 |
| 6,089,674 | A | * | 7/2000 | Whitman | 301/111.01 |
| 6,739,674 | B1 | * | 5/2004 | Vignotto | 301/35.627 |

* cited by examiner

*Primary Examiner*—Robert A. Siconolfi
(74) *Attorney, Agent, or Firm*—Michael Best & Friedrich LLP

(57) ABSTRACT

A wheel hub having pilots to guide the installation of a braking device on the wheel hub, wherein the pilots are provided with guide surfaces that are made of a different material than the wheel hub.

25 Claims, 5 Drawing Sheets

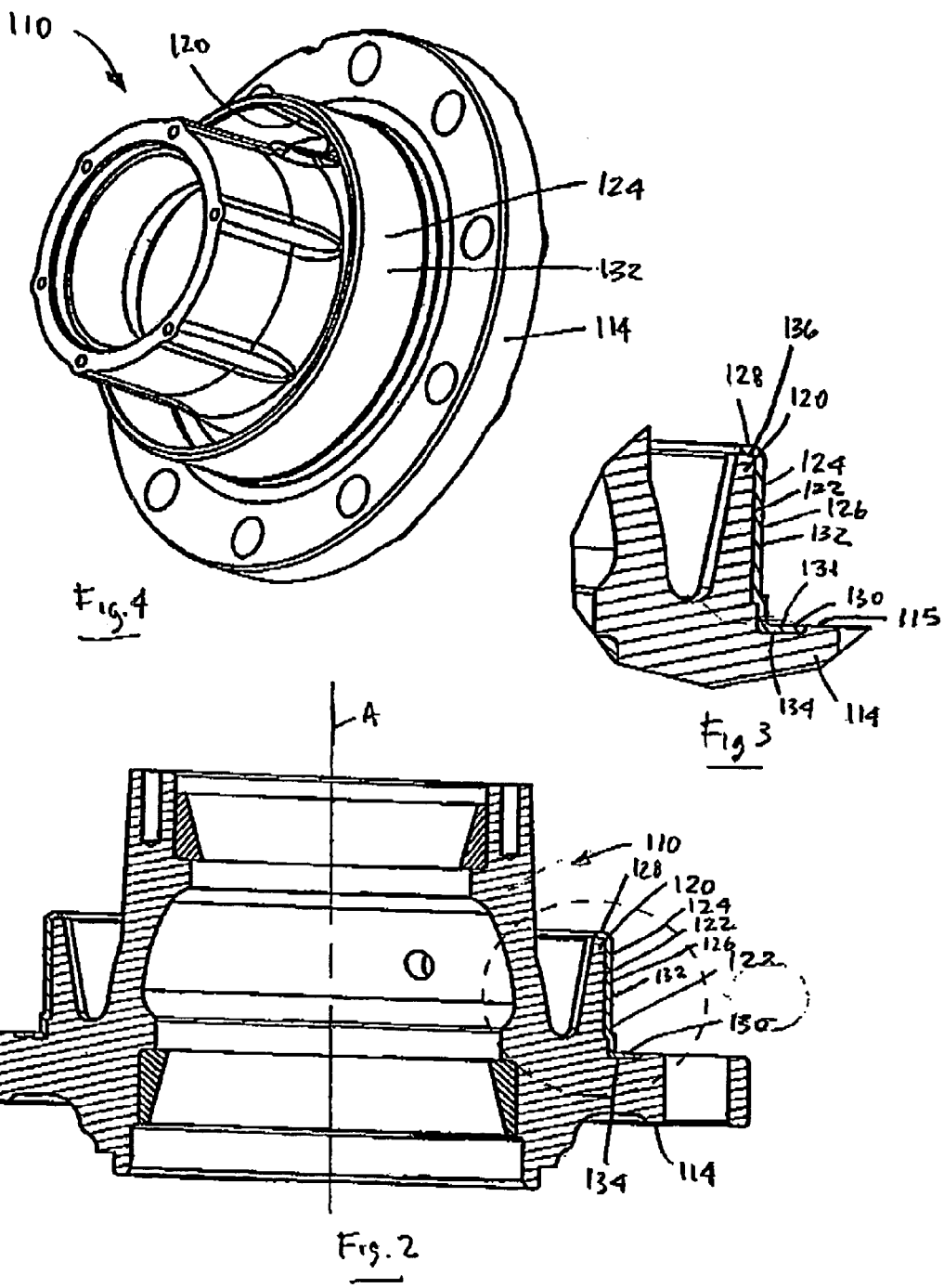

WHEEL HUB PILOT PROTECTOR

FIELD OF THE INVENTION

The present invention relates to mounting a braking device on a wheel hub and especially to a wheel hub having a pilot surface for mounting a braking device, wherein the pilot surface is made of a different material from the body of the wheel hub.

BACKGROUND

In a conventional wheel hub, a braking device, such as a brake drum, is mounted coaxially on the wheel hub by wheel bolts. Misalignment between the brake drum and the wheel hub can cause various problems, such as vibration, shimmy, premature wear and/or failure of the brake drum. These problems can occur even if the brake drum is off-center by only 1/16th of an inch, which is too small to visually detect.

Wheel hubs are often formed with pilots that provide a radial guide surface to assist in the proper installation and alignment of the brake drum on the wheel hub. An example of a wheel hub pilot is disclosed in Pete et al. U.S. Pat. No. 5,890,567, entitled "Brake Drum Mounting," which is incorporated herein by reference. To ensure proper alignment, such wheel hub pilots are manufactured with a tolerance of thousandths of an inch.

The wheel hub pilots can become dented, scraped or otherwise damaged during installation of the brake drum on the wheel hub. Lightweight aluminum wheel hubs are particularly prone to pilot surface damage. Such damage can cause misalignment of the brake drum and result in the various problems described above. Thus, there is a need for an accurate pilot guide surface that is relatively inexpensive to produce and is resistant to damage during installation of a braking device.

SUMMARY OF THE INVENTION

These needs and other needs are satisfied by the present invention, which comprises a wheel hub having a main body made of a first material and a pilot surface formed of a second material. A radial flange extends from the main body of the wheel hub, the radial flange having a pilot for guiding the installation of a braking device on the wheel hub. A pilot protector is positioned over the pilot to provide a guide surface on the pilot for contacting the braking device during installation of the braking device. The pilot protector is formed of a second material that is different from the first material.

BRIEF DESCRIPTION OF THE DRAWINGS

FIG. 2 shows a side section view of the wheel hub and pilot protector of the present invention.

FIG. 3 shows a detail view of the wheel hub and pilot protector of FIG. 2.

FIG. 4 shows a perspective view of the wheel hub and pilot protector of FIG. 2.

DETAILED DESCRIPTION OF THE INVENTION

Figure 1:
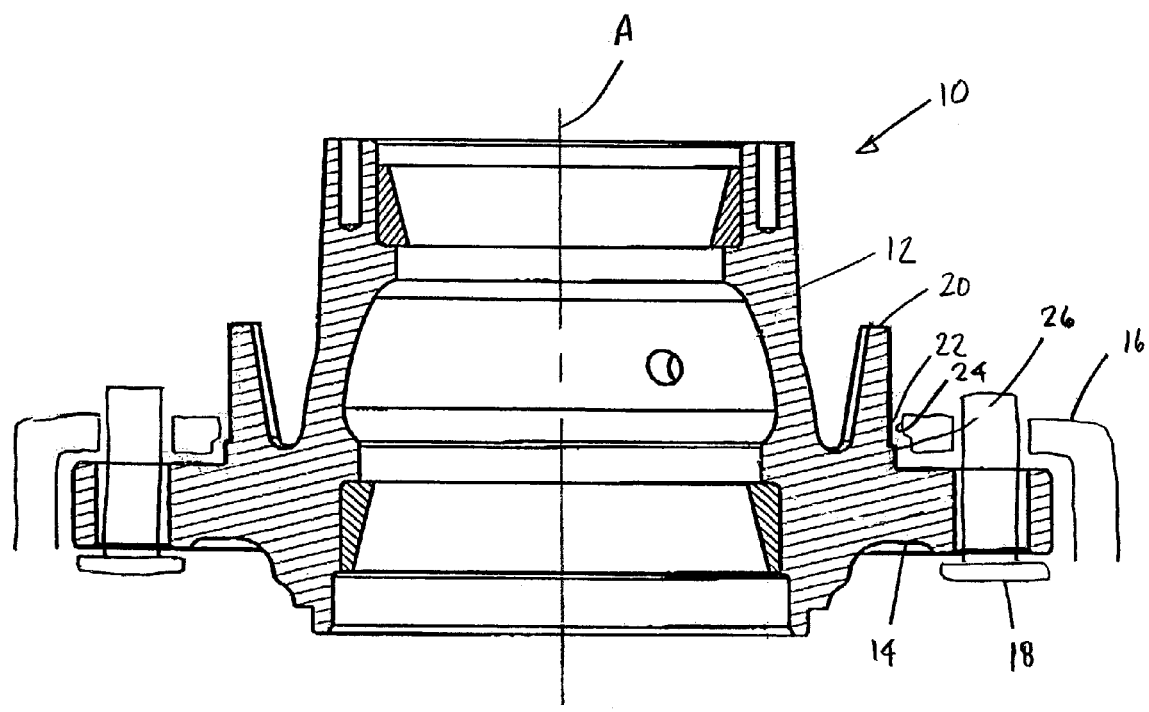
FIG. 1 shows a side section view of a prior art wheel hub and brake drum assembly.

In accordance with the present invention, a wheel hub pilot protector provides a radial guide surface that is resistant to damage that may result during installation of the braking device. FIG. 1 shows a prior art wheel hub 10, comprising a main body 12 with a radial flange 14 extending from the main body. A brake drum 16 is mounted on radial flange 14 by wheel bolts 18. A plurality of pilots 20 are formed on radial flange 14 to guide the installation of brake of drum 16 on wheel hub 10. Pilots 20 are provided with radial guide surfaces 22, which contact corresponding brake drum guides 24. To ensure proper alignment between wheel hub 10 and brake drum 12, pilot surfaces 22 and brake drum guides 24 are typically manufactured with tolerances of approximately 15–30 thousandths of an inch.

Wheel hub 10 is usually formed of relatively soft materials, such as cast ductile iron, aluminum, magnesium composites and other materials. Consequently, pilot surfaces 22 are susceptible to dents, scrapes and other damage caused by mishandling or imprecise installation of the heavy brake drum. Such damage can cause misalignment between the wheel hub and brake drum, resulting in vibration, shimmy, premature wear and/or failure of the brake drum.

Figure 5:
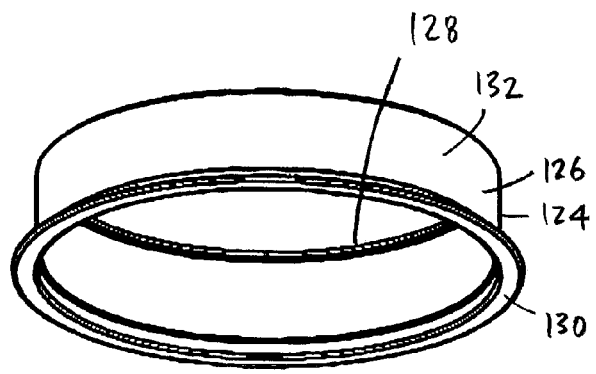
FIG. 5 shows a perspective view of the pilot protector of the present invention.
Figure 6:
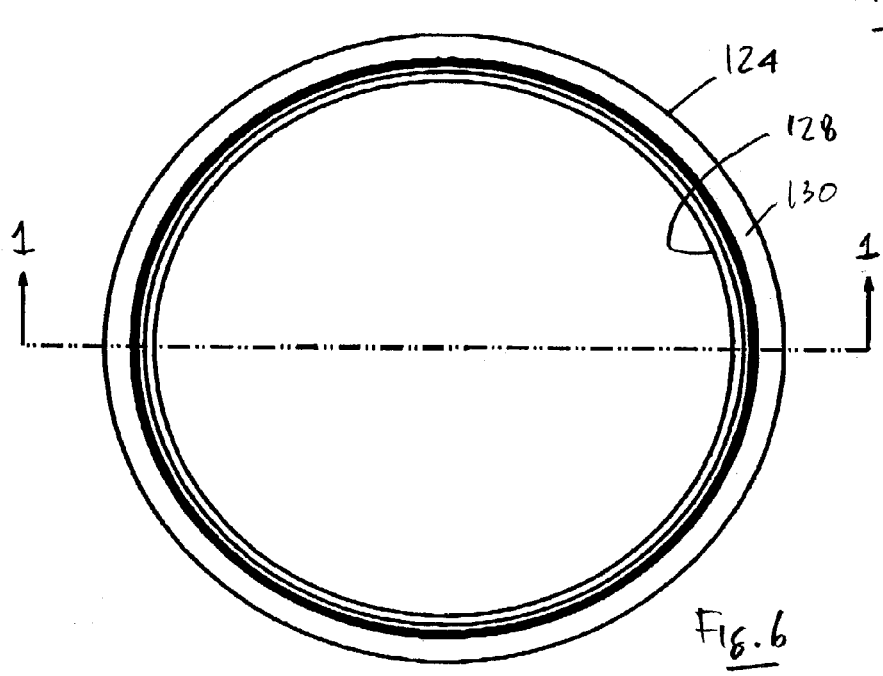
FIG. 6 shows a top plan view of the pilot protector of FIG. 5.
Figure 7:
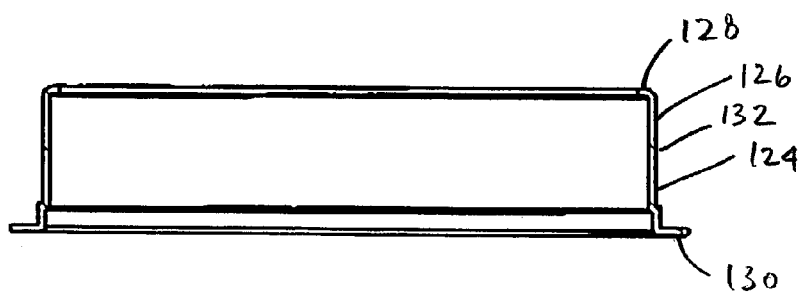
FIG. 7 shows a side section view of the pilot protector of FIG. 6, taken along lines 1—1.

FIGS. 2–4 show a wheel hub 110, which has the same configuration as the prior art wheel hub shown in FIG. 1, except that the wheel hub pilots 120 are encircled by a pilot protector ring 124 of the present invention. Pilot protector ring 124 has a side wall 126 with upper and lower rim flanges 128, 130, as best shown in FIGS. 5–7. The outer surface 132 of side wall 126 has a profile that is identical to the profile of prior art pilot surfaces 22. Similarly, the radius of outer surface 132 is identical to the radius of prior art pilot surfaces 22, relative to the axis A of wheel hub 10. Thus, pilot protector ring 124 provides the guide surface 122 for mounting the brake drum (not shown) on wheel hub 110.

As best shown in FIG. 4, pilot 120 and a contiguous portion of wheel hub radial flange 114 are adapted to receive pilot protector ring 124. Wheel hub radial flange 114 is provided with a radial groove 134 that is shaped to receive lower rim flange 130 of pilot protector ring 124. The depth of groove 134 is identical to the thickness of lower rim flange 130, such that a surface 131 of lower rim flange 130 and a surface 115 of radial flange 114 together present a single smooth continuous surface. Radial guide surfaces 122 of pilots 120 are similarly reduced by the thickness of pilot protector ring side wall 126. The top portion 136 of pilots 120 is also reduced to fit beneath upper rim flange 128 of pilot protector ring 124 or, alternatively, side wall 126 of pilot protector ring 124 may be lengthened sufficiently to allow upper rim flange 128 to fit over top portion 136 of pilots 120. Preferably, there is no gap between the pilot protector ring 124 and pilots 120, and they closely conform to each other. As a result, when pilot protector ring 124 is installed over pilots 120, it presents the same guide surface profile and radial dimensions relative to axis A as prior art pilots 20.

In a preferred embodiment, pilot protector ring 124 is formed of relatively hard materials, as compared to the wheel hub, such as steel, ceramic, composites or other materials which are resistant to damage that may ordinarily result during installation of the brake drum. In an alternative embodiment, pilot protector ring 124 may be formed of a resilient material, such as plastic, urethane or other synthetic polymers and composites that are flexible enough to return to their original shape and dimensions if deformed during installation of the brake drum. The pilot protector ring may be formed by any number of methods that are well known in the art, such as stamping in the case of metals, or molding in the case of synthetic materials.

In a preferred embodiment, the pilot protector is placed within a wheel hub mold and the wheel hub is cast around the pilot protector, so that they are permanently fixed together. Further means for physically attaching the pilot protector to the wheel hub include mechanical means, adhesives, or other means well known in the art and appropriate to the material used to form the pilot protector ring. In an alternative embodiment, the pilot protector is formed separately from the wheel hub and is shaped to press fit over the wheel hub. In a further embodiment, the pilot protector is not physically attached to the wheel hub, but is simply held in place between the attached brake drum and the wheel hub.

It will be apparent to those of skill in the art, that the inventive pilot protector may also be used in connection with pilot surfaces for other devices that are mounted coaxially on the wheel hub, such as a brake disk or a wheel.

In contrast to a cast wheel hub with machined pilots, the inventive pilot protector ring has a simple geometry and is relatively small, and, therefore, is much easier to manufacture to the high tolerances required to ensure proper alignment of the wheel hub and brake drum. Thus, the use of the inventive pilot protector ring reduces the difficulties and costs involved in manufacturing wheel hubs.

In addition, the pilot protector ring reduces the likelihood of galvanic corrosion between the wheel hub and brake drum, which is a common problem in the industry. Galvanic corrosion is caused when dissimilar metals are placed in contact in the presence of an electrolyte, such as salt water. The pilot protector ring prevents galvanic corrosion by physically separating the wheel hub from direct contact with the brake drum.

Figure 8:
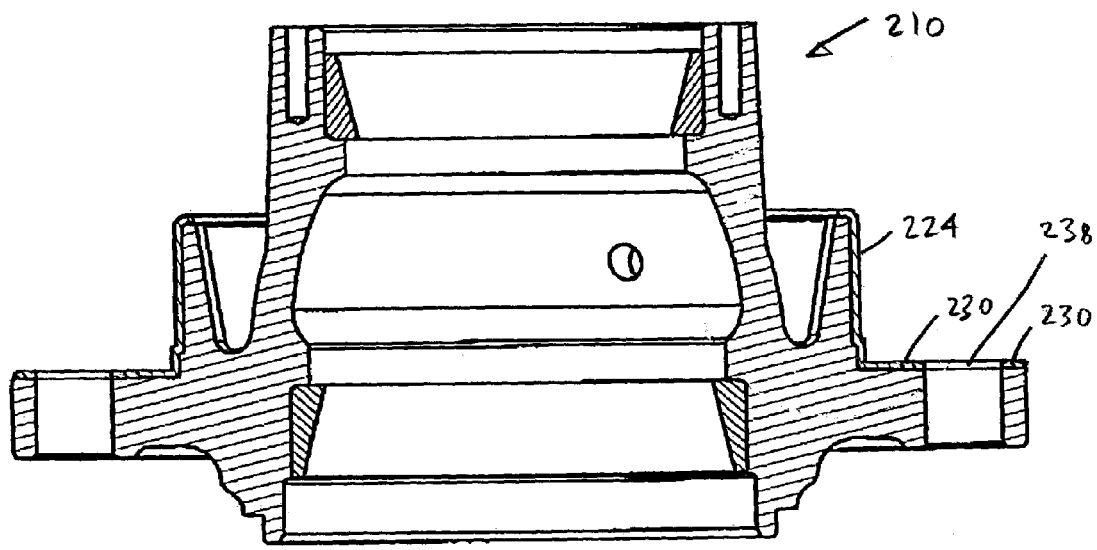
FIG. 8 shows a side section view of the wheel hub and pilot protector in an alternative embodiment of the present invention.

In an alternative embodiment shown in FIG. 8, lower rim flange 230 of pilot protector 224 may be extended to cover the entire width of a wheel hub radial flange 214 and include openings 238 for the wheel bolts (not shown), thereby obviating the need to form a radial groove in the radial flange to receive the lower rim flange.

Figure 9:
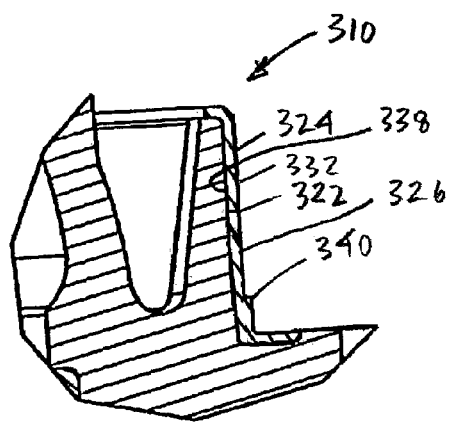
FIG. 9 shows a side section view of the wheel hub and pilot protector in another alternative embodiment of the present invention.

In yet another embodiment, details in the profile of prior art pilot surfaces 22 (FIG. 1), such as boss 26, are only reproduced in the outer surface of the side wall of the pilot protector. As shown in FIG. 9, pilot protector 324 has a side wall 326 with outer and inner surfaces 332, 338. Outer surface 332 is provided with a step or boss 340 to reproduce the profile of prior art pilot surfaces 22 having a corresponding boss 26. In contrast, inner surface 338 of side wall 326 has an even, planar surface, without details. Pilot surface 322 of wheel hub 310 is similarly shaped with an even planar surface to receive inner surface 338 of pilot protector 324. A variety of pilot protectors may be produced having the same even inner surface profile, to match the shape or configuration of the wheel hub, but different outer surface profiles to accommodate the mounted brake drum. Thus, the same wheel hub 310 may be provided with different pilot surface profiles, simply by using pilot protectors having different outer surface profiles.

Figure 10:
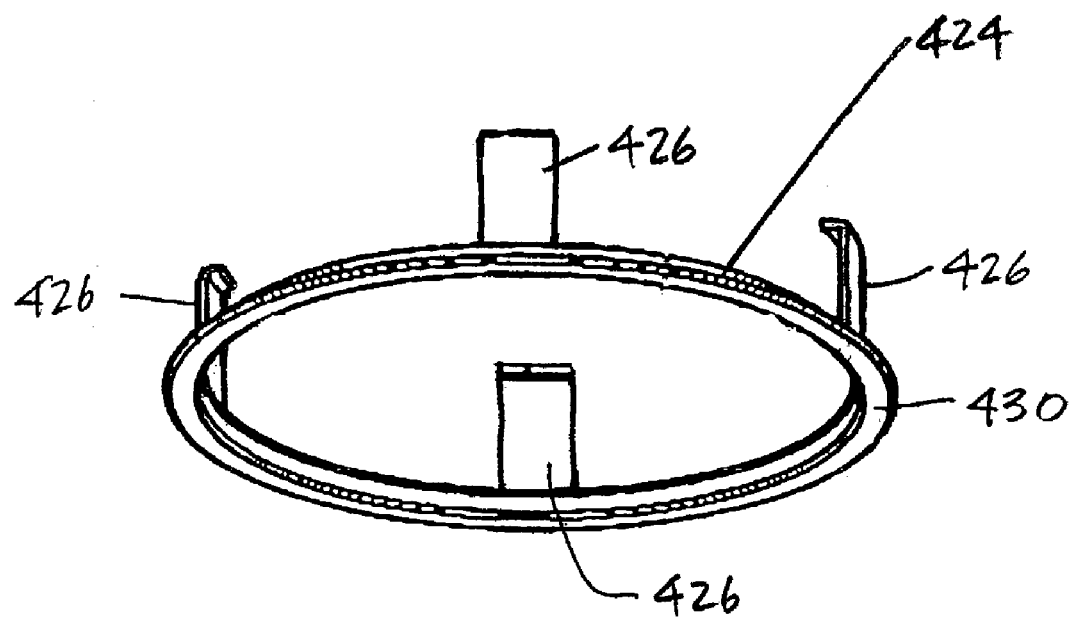
FIG. 10 shows a perspective view of the pilot protector in a further alternative embodiment of the present invention.

It will be apparent to those of skill in the art that the pilot protector need not be a complete ring and that other configurations are possible. FIG. 10 shows yet another embodiment, in which the pilot protector 424 comprises a series of individual side wall flanges 426 projecting from a lower rim flange 430. Each side wall flange 426 is positioned and shaped to correspond and conform to a wheel hub pilot surface.

Figure 11:
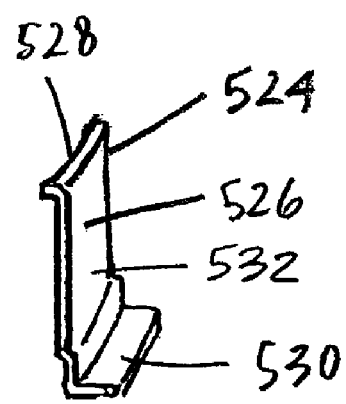
FIG. 11 shows a perspective view of the pilot protector in a further alternative embodiment of the present invention.

In yet another embodiment shown in FIG. 11, the pilot protector 524 is an individual flange, comprising a side wall 526 with upper and lower tabs 528 and 530, respectively. Side wall 526 is sized and shaped to correspond and conform to a wheel hub pilot surface, such that each wheel hub pilot receives a separate pilot protector 524. Such pilot protectors may have outer surfaces 532 with the same or different profiles.

It will be apparent to those of skill in the art that modifications may be made without departing from the spirit and scope of the invention. Accordingly, it is not intended that the invention be limited except in view of the appended claims.

What is claimed is:

1. A wheel hub, comprising:
   a main body;
   a radial flange made of a first material extending from said main body, said radial flange having a flange surface and a groove formed in said flange surface;
   a pilot formed on said radial flange for aligning a braking device relative to said radial flange; and
   a pilot protector made of a second material different than said radial flange, said pilot protector at least partially covering said pilot and having a protector flange at least partially positioned within said groove.

2. The wheel hub of claim 1, wherein said pilot protector encircles said main body.

3. The wheel hub of claim 1, wherein said pilot protector is a ring removably attached to said pilot.

4. The wheel hub of claim 1, wherein at least a part of said radial flange is coplanar with at least a part of said protector flange.

5. The wheel hub of claim 1, wherein said protector flange includes a top surface and a bottom surface and said groove includes a bottom groove surface, and wherein said bottom surface of said protector flange engages said bottom groove surface and said top surface of said protector flange is coplanar with said flange surface.

6. The wheel hub of claim 1, wherein said pilot protector is formed separately from said pilot.

7. A wheel hub comprising:
   a main body;
   a radial flange extending from said main body, said radial flange having a flange surface and a groove formed in said flange surface;
   a pilot formed on said radial flange for aligning a braking device relative to said radial flange; and
   a pilot protector at least partially covering said pilot and having a protector flange at least partially positioned within said groove.

8. The wheel hub of claim 7, wherein the radial flange is made of a first material and the pilot protector is made of a second material different than said radial flange.

9. The wheel hub of claim 7, wherein said pilot protector encircles said main body.

10. The wheel hub of claim 7, wherein said pilot protector is a ring removably attached to said pilot.

11. The wheel hub of claim 7, wherein at least a part of said radial flange is coplanar with at least a part of said protector flange.

12. The wheel hub of claim 7, wherein said protector flange includes a top surface and a bottom surface and said groove includes a bottom groove surface, and wherein said bottom surface of said protector flange engages said bottom groove surface and said top surface of said protector flange is coplanar with said flange surface.

13. The wheel hub of claim 7, wherein said pilot protector is formed separately from said pilot.

14. A wheel hub, comprising:
a main body having an axis extending therethrough;
a radial flange made of a first material extending from said main body, said radial flange having a first surface;
a pilot formed on said radial flange for aligning a braking device relative to said radial flange, wherein at least a portion of the pilot extends in a direction parallel to the axis and is spaced from the main body; and
a pilot protector made of a second material different than said radial flange, said pilot protector at least partially covering said pilot and including a second surface, said second surface being substantially continuous with said first surface;
wherein the pilot protector covers the at least a portion of the pilot extending in the axial direction and being spaced from the main body.

15. The wheel hub of claim 14, wherein said second surface is radial to said main body and has a predetermined radius.

16. The wheel hub of claim 15, wherein said second surface encircles said main body.

17. The wheel hub of claim 16, wherein said second surface is on a flange sized and shaped to correspond to said pilot.

18. The wheel hub of claim 14, wherein said pilot protector is a ring removably attached to said pilot.

19. The wheel hub of claim 14, wherein said first material is selected from a group consisting of: cast iron, aluminum, magnesium and combinations thereof.

20. The wheel hub of claim 14, wherein said second material is selected from a group consisting of: metal, ceramic, synthetic polymer and combinations thereof.

21. The wheel hub of claim 14, wherein said second material is steel.

22. The wheel hub of claim 14, wherein said second material is non-resilient.

23. The wheel hub of claim 14, wherein at least a part of said second surface is coplanar with at least a part of said first surface.

24. The wheel hub of claim 14, wherein said pilot includes a radial surface and a top surface, said pilot protector covering said radial surface and extending at least partially over said top surface of said pilot.

25. The wheel hub of claim 14, wherein said pilot protector is formed separately from said pilot.

* * * * *

UNITED STATES PATENT AND TRADEMARK OFFICE
Certificate

Patent No. 7,159,697 B1　　　　　　　　　　　　　　　　　　　　　Patented: January 9, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Omar J. Fakhoury, Rockford, IL (US); Reginal A. Pete, Caledonia, IL (US); Jeffrey W. Clark, Rockford, IL (US); and Thomas A. Parsons, Roscoe, IL (US).

Signed and Sealed this Fourteenth Day of October 2008.

ROBERT A. SICONOLFI
*Supervisory Patent Examiner*
Art Unit 3683